(12) United States Patent
Meisels et al.

(10) Patent No.: US 10,296,190 B2
(45) Date of Patent: May 21, 2019

(54) SPATIALLY ORGANIZING COMMUNICATIONS

(71) Applicant: MICROSOFT TECHNOLOGY LICENSING, LLC, Redmond, WA (US)

(72) Inventors: Josh Meisels, Seattle, WA (US); Scott Stiles, Redmond, WA (US); Ned Bearer Friend, Seattle, WA (US); Michael Borysenko, Seattle, WA (US); Vignesh Sachidanandam, Redmond, WA (US); Trevor Lacey, Sammammish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 14/966,684

(22) Filed: Dec. 11, 2015

(65) Prior Publication Data

US 2017/0168684 A1    Jun. 15, 2017

(51) Int. Cl.
*G06F 3/048* (2013.01)
*G06F 3/0484* (2013.01)
*G06Q 10/10* (2012.01)
*G06F 3/0482* (2013.01)
*G06F 3/0486* (2013.01)
*G06F 7/08* (2006.01)
(Continued)

(52) U.S. Cl.
CPC ........ *G06F 3/04845* (2013.01); *G06F 3/0481* (2013.01); *G06F 3/0482* (2013.01); *G06F 3/0486* (2013.01); *G06F 3/04842* (2013.01); *G06F 7/08* (2013.01); *G06F 17/211* (2013.01); *G06Q 10/10* (2013.01); *H04L 51/10* (2013.01); *H04L 51/22* (2013.01); *H04L 51/26* (2013.01)

(58) Field of Classification Search
CPC ......... G06F 3/048; G06Q 10/10; H04L 51/04; H04L 51/00; H04L 41/026
See application file for complete search history.

(56) References Cited

U.S. PATENT DOCUMENTS 5,533,110 A * 7/1996 Pinard ................. H04M 1/2473
                                            379/201.04
7,072,450 B1 * 7/2006 Pinard .................... G06Q 10/10
                                            345/419
(Continued)

FOREIGN PATENT DOCUMENTS

EP    1865408 A2    12/2007

OTHER PUBLICATIONS

"International Search Report and Written Opinion Issued in PCT Application No. PCT/US2016/063714", dated Apr. 20, 2017, 11 Pages.
(Continued)

*Primary Examiner* — Phuong H Nguyen
(74) *Attorney, Agent, or Firm* — Michael Best & Friedrich LLP

(57) ABSTRACT

Spatial organization of communications is provided. A communication application initiates operations to present a visual representation of a communication on a two-dimensional canvas after a detected intent to do as such. In response to the intent, the visual representation is generated and displayed on the two-dimensional canvas. A detected interaction with the visual representation triggers a modification of the communication based on the interaction.

20 Claims, 7 Drawing Sheets

(51) Int. Cl.
   *G06F 17/21* (2006.01)
   *H04L 12/58* (2006.01)
   *G06F 3/0481* (2013.01)

(56) References Cited

U.S. PATENT DOCUMENTS

| | | | |
|---|---|---|---|
| 7,752,556 B2 | 7/2010 | Forstall et al. | |
| 8,875,051 B2 | 10/2014 | Costenaro et al. | |
| 9,077,672 B2 | 7/2015 | Khoo | |
| 2004/0017376 A1* | 1/2004 | Tagliabue | H04M 1/27455 345/581 |
| 2004/0243677 A1* | 12/2004 | Curbow | G06Q 10/107 709/206 |
| 2007/0168892 A1* | 7/2007 | Brush | G06Q 10/109 715/751 |
| 2008/0005087 A1* | 1/2008 | Sato | G06F 12/0862 |
| 2008/0148181 A1* | 6/2008 | Reyes | G06F 3/0482 715/801 |
| 2008/0207274 A1* | 8/2008 | Kim | H04M 1/72544 455/566 |
| 2008/0215990 A1* | 9/2008 | Sellen | G06Q 10/109 715/751 |
| 2008/0263457 A1* | 10/2008 | Kim | H04M 1/274583 715/753 |
| 2009/0100347 A1* | 4/2009 | Schemers | G06Q 10/109 715/751 |
| 2010/0037144 A1* | 2/2010 | Vance | G06F 3/04817 715/739 |
| 2010/0050086 A1* | 2/2010 | Sherrard | G06F 3/04817 715/739 |
| 2010/0093316 A1 | 4/2010 | Doppler et al. | |
| 2010/0162153 A1* | 6/2010 | Lau | G06F 3/0488 715/769 |
| 2010/0216448 A1* | 8/2010 | Jeon | G06F 3/04817 455/418 |
| 2010/0245262 A1* | 9/2010 | Vance | G06Q 10/107 345/173 |
| 2010/0293613 A1* | 11/2010 | Hum | G06Q 20/32 726/20 |
| 2010/0306004 A1 | 12/2010 | Burtner et al. | |
| 2011/0173553 A1* | 7/2011 | Karmon | G06Q 10/107 715/767 |
| 2011/0191688 A1* | 8/2011 | Hasegawa | G06F 15/00 715/738 |
| 2011/0258559 A1* | 10/2011 | You | G06Q 10/107 715/752 |
| 2011/0313805 A1 | 12/2011 | Heydemann et al. | |
| 2012/0254765 A1* | 10/2012 | Apfel | H04L 67/306 715/739 |
| 2012/0290945 A1 | 11/2012 | Byrne et al. | |
| 2013/0109363 A1* | 5/2013 | Yang | H04M 1/2745 455/414.1 |
| 2014/0164949 A1 | 6/2014 | Guzman et al. | |
| 2014/0213318 A1* | 7/2014 | Leem | G06F 3/0486 455/556.1 |
| 2014/0218391 A1 | 8/2014 | McConnell et al. | |
| 2014/0280616 A1* | 9/2014 | Ramanathan | H04L 51/22 709/206 |
| 2015/0074546 A1 | 3/2015 | Slawson et al. | |
| 2016/0197866 A1* | 7/2016 | Cha | H04L 51/12 709/205 |

OTHER PUBLICATIONS

"Pinboard Documentation", Published on: Oct. 29, 2014 Available at: https://themify.me/docs/pinboard-documentation.

Rubino, Daniel, "How to Add Wallpaper to the Windows 10 Mail App", Published on: Aug. 5, 2015 Available at: http://www.windowscentral.com/how-add-wallpaper-windows-10-mail-app.

Huculak, Mauro, "How to Manage Accounts in the New Mail and Calendar App for Windows 10", Published on: May 18, 2015 Available at: http://www.windowscentral.com/how-manage-accounts-new-mail-and-calendar-app-windows-10.

Pathak, Khamosh, "How to Create, Call, Email, and Message Shortcuts for Contacts on iPhone", Published on: Apr. 15, 2015 Available at: http://www.guidingtech.com/36289/create-call-email-message-shortcuts-contacts-iphone/.

Patterson, Ben, "Android Tip: Pin a Favorite Contact Directly to Your Home Screen", Published on: Feb. 24, 2015 Available at: http://heresthethingblog.com/2015/02/24/android-tip-put-favorite-contracts/.

"Pin a Contact to Your Windows Phone Home Screen", Retrieved on: Sep. 28, 2015 Available at: https://support.office.com/en-us/article/Pin-a-contact-to-your-Windows-Phone-home-screen-2703b8d3-7917-4702-9d01-bd8090ff296e.

Thordarson, Bob, "How to Customize the Reading Pane and Message Preview in Outlook 2013", Published on: Aug. 21, 2013 Available at: http://www.scrubly.com/blog/how-to-outlook/how-to-customize-the-reading-pane-and-message-preview-in-outlook-2013/.

Javaid, Usman, "Customize Mac Mail App Message and Message Viewer Panes with WideMail", Published on: Jun. 28, 2011 Available at: http://www.addictivetips.com/mac-os/customize-mac-mail-app-message-and-message-viewer-panes-with-widemail/.

Carver, Benjamin, "Understanding Background Images in Email", Retrieved on: Sep. 28, 2015 Available at; https://litmus.com/community/learning/25-understanding-background-images-in-email.

* cited by examiner

SPATIALLY ORGANIZING COMMUNICATIONS

BACKGROUND

Communication applications allow participants to communicate with each other rapidly through electronic messaging. A participant usually has several email accounts including a work email account, and a personal email account, among others. The communication application manages the email accounts by organizing and grouping emails associated with an account to folders, such as an inbox folder, a group folder, among others. Modern communication applications lack trans-account aggregation features when a participant requests group information associated with multiple email accounts.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to spatial organization of communications. In an example scenario, a communication application may detect an intent to interact with a communication a two-dimensional canvas. In response to the intent, a visual representation of the communication may be generated for a presentation on the two-dimensional canvas. Next, the visual representation may be displayed on the two-dimensional canvas. The visual representation may float within the two-dimensional canvas. The communication application may also detect an interaction with the visual representation. In response to the interaction, the communication may be modified based on the interaction.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
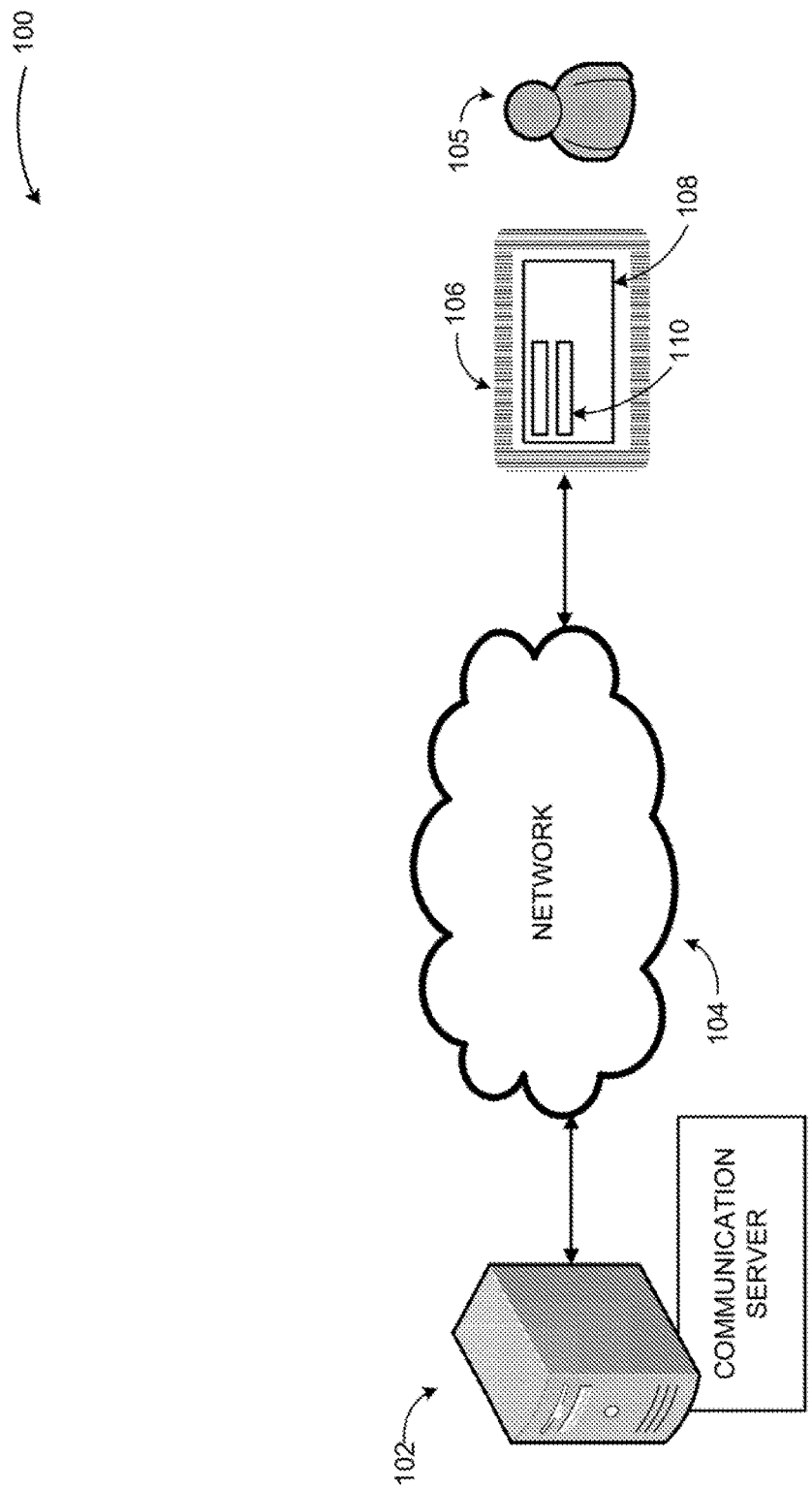
FIG. 1 is a conceptual diagram illustrating an example computing environment for spatially organizing communications, according to embodiments.

As briefly described above, spatial organization of communications may be provided. In some examples, a communication application may detect an intent to interact with a communication on a two-dimensional canvas. The communication may include an instant messaging communication, an email, a text message, an audio message, a video message, and/or a graphical message, among other examples. In response to the intent, a visual representation of the communication may be generated for a presentation on the two-dimensional canvas. The visual representation may include attributes associated with the communication, a priority level associated with the communication, a deadline associated with the communication, and/or information associated with the communication, among other properties of the communication.

Next, the visual representation may be displayed on the two-dimensional canvas. The visual representation may float within the two-dimensional canvas. The communication application may also detect an interaction with the visual representation. The interaction may include action(s) to group the communication with other(s) and/or to sort the communication and other(s), among other actions. In response to the interaction, the communication may be modified based on the interaction.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for spatially organizing communications. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may he a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using communications herein, embodiments are not limited to the communications. Spatially organizing communications may be implemented in other environments, such as instant messages, data sharing, application sharing, online conferencing, and similar communications, where communication data may be exchanged.

The technical advantages of spatially organizing communications may include, among others, an increased efficiency of participant interactions as a result of communication presentation and communication prioritization. Further, a time period utilized to extract information from a communication may be decreased as the result of an increased efficiency in the grouping of the communications. Additionally, a user interface for spatially organizing the communication and another communication may decrease a recall time to identify communication information. Processing and network bandwidth usage may also be reduced by avoiding repeated edits to the grouping of the communications.

Embodiments address a need that arises from very large scale of operations created by networked computing and cloud based services that cannot be managed by humans. The actions/operations described herein are not a mere use of a computer, but address results of a system that is a direct consequence of software used as a service such as task services offered in conjunction with the tasks.

FIG. 1 is a conceptual diagram illustrating an example computing environment for spatially organizing communications, according to embodiments.

As shown in a diagram 100, a computing device 106 may execute a communication application 108. The computing device 106 may include a display device, such as a touch enabled display component, and a monitor, among others, that is used to present the communication application 108 to a participant 105. The computing device 106 may include a desktop computer, a laptop computer, a tablet, a smart phone, and a wearable computer, among other similar computing devices, for example.

In an alternative example scenario, the communication application 108 may be executed on a communication server 102. The communication server 102 may include a web server or a document server, among others. The computing device 106 may display a client user interface of the, communication application 108. The computing device 106 may communicate with the communication server 102 through a network 104. The network 104 may provide wired or wireless communications between nodes, such as the computing device 106 or the communication server 102.

In other examples, the communication application 108 may be provided by a third party service, web applications, and: or a datacenter, among others. Local access to the communication application 108 may be provided by locally installed rich clients (a local version of the communication application 108) or genetic applications, such as a browser on the computing device 106.

The communication application 108 may detect intent to interact with a communication on a two-dimensional canvas. In response to the intent, a visual representation of the communication may be generated for a presentation on the two-dimensional canvas. The visual representation may include attributes associated with the communication, a priority level associated with the communication, a deadline associated with the communication, and/or information associated with the communication, among other properties. The visual representation may also include a summary view of the communication The visual representation may present attributes associated with the communication, a priority level associated with the communication, a deadline associated with the communication, and/or information associated with the communication, among other properties of the communication.

Next, the visual representation may be displayed on the two-dimensional canvas. The visual representation may float within the two-dimensional canvas. The communication application may also detect an interaction with the visual representation. The interaction may include inputs) to group the communication with other(s) and/or to sort the communication and other(s), among other actions. In response to the interaction, the communication may be modified based on the interaction.

The communication application 108 may automate operations to spatially organize communications. Furthermore, the communication application 108 may resize the two-dimensional canvas and the visual representation(s) based on a type of the computing device 106 and a size of the display device of the computing device 106. The two-dimensional canvas and the visual representation(s) may be resized to present a similar experience across multiple device of varying screen sizes.

While the example system in FIG. 1 has been described with specific components including the computing device 106, the communication application 108, and the communication server 102, embodiments are not limited to these components or system configurations and can be implemented with other system configuration employing fewer or additional components.

Figure 2:
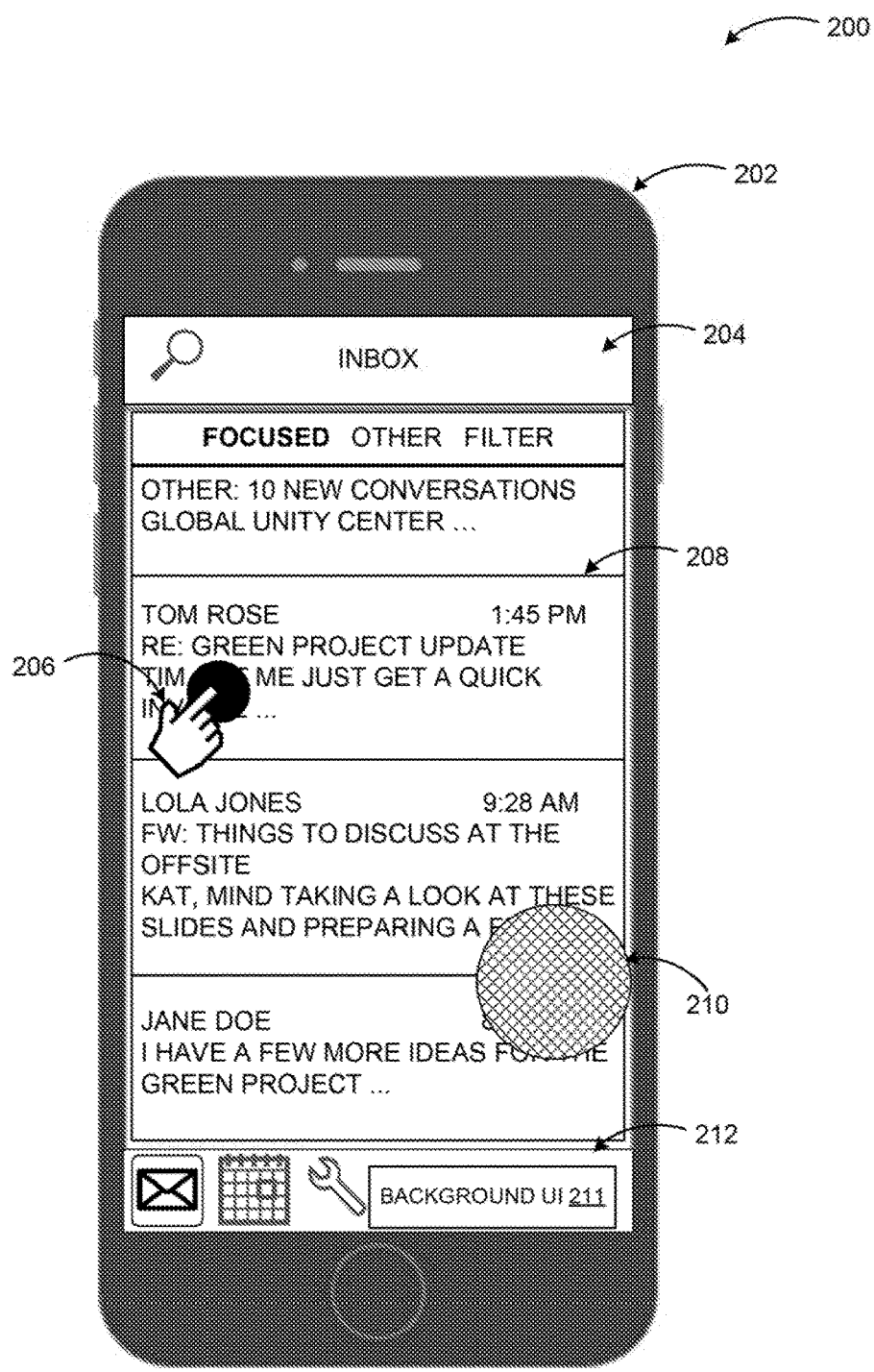
FIG. 2 is a display diagram illustrating a scheme to display a visual representation of a communication on a two-dimensional canvas, according to embodiments.

FIG. 2 is a display diagram illustrating a scheme to display a visual representation of a communication on a two-dimensional canvas, according to embodiments.

In a diagram 200, a computing device 202 may provide a communication application 204 to spatially organize communications. The communication application 204 may include a rendering engine and a content engine, among other modules. The communication application 204 may initiate operations to present a communication 208 with a visual representation after the rendering engine detects an intent 206 to interact with the communication 208. The intent 206 may include a drag and drop action, a tap action, a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others.

Next, the content engine may generate a visual representation of the communication 208. The visual representation of the communication 208 may include a widget and/or an icon that displays textual information, graphical information, and/or audio information, among other information of the communication 208. In examples, the content engine may provide the visual representation to the rendering engine for display on a two-dimensional canvas (410). The two-dimensional canvas may present a graphic, textual information, and/or a theme that is customizable by a participant.

In some examples, the communication application 204 may display a shortcut element 210 associated with the two-dimensional canvas (410). The content engine may generate a visual representation of the communication 208 (for display on the two-dimensional canvas) in response to a move action. The move action may be detected. In response to a movement of the communication 208 to the shortcut element 210 by the participant. In an example scenario, the move action may include a drag and drop input moving the communication 208. A press and hold action may also be detected as the move action to move, the communication 208 to the shortcut element 210.

In other examples, the communication application 204 may display controls 212 (graphical and/or textual control elements). The controls 212 may allow the participant to perform actions on the communication 208. The actions may include editing, copying, and/or moving the communication 208.

In further examples, a canvas element 211 may also be provided. The canvas element 211 may include operations to generate and display a visual representation of a selected communication (such as the communication 208) on the two-dimensional canvas (410).

Figure 3:
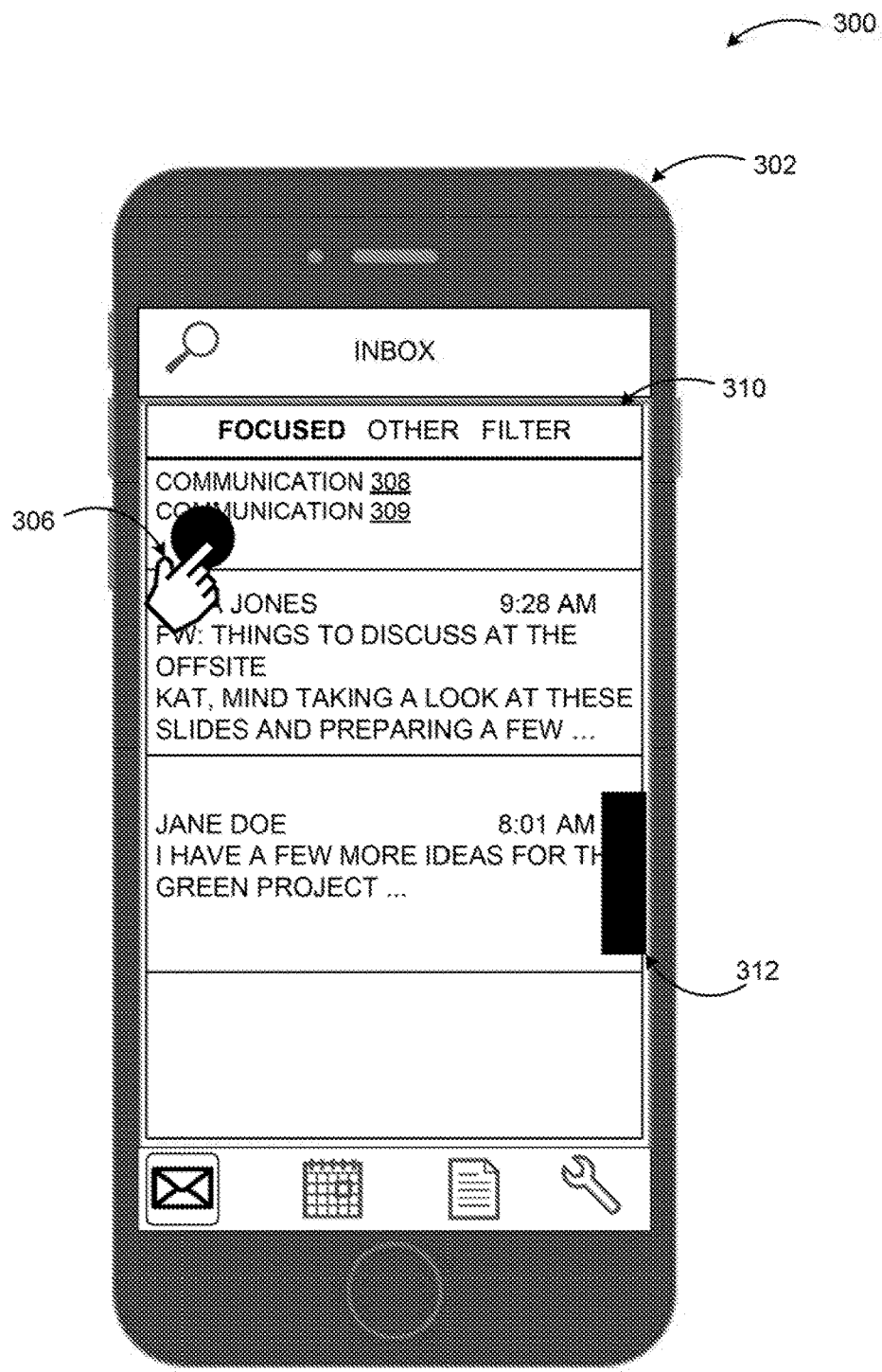
FIG. 3 is a display diagram illustrating another scheme to display a visual representation of a communication on a two-dimensional canvas, according to embodiments.

FIG. 3 is a display diagram illustrating another scheme to display the visual representation of a communication on a two-dimensional canvas, according to embodiments.

In a diagram 300, a computing device 302 may execute a communication application 310. The communication application 310 may include a rendering engine and a content engine, among other modules. The rendering engine of the communication application 310 may display a communication 308 and a communication 309. In response to an intent 306, the content engine may generate visual representations for the communications (308 and 309). The visual representations may be displayed on a two-dimensional canvas (410) by the rendering engine.

In an example scenario, the rendering engine t may display a shortcut element 312 associated with the two-dimensional canvas (410). The content engine may execute operations to generate a visual representation of a communication 308 in response to a move action to move the communication 308 to the shortcut element 312. An example of the move action may include a drag and drop action. Next, the rendering engine may display the, visual representation of the communication 308 in the two-dimensional canvas (410). Alternatively, the two-dimensional canvas (410) may be displayed by the rendering engine in response to another input on the shortcut element 312. Example of the other action may include a swipe action, among similar ones.

in further examples, the content engine may receive an update associated with the communication 308. For example, the update may include a delay for a flight departure associated with the communication 308. In response to the received update, the content engine may revise the visual representation with the update. The rendering engine may display the updated visual representation on the two-dimensional canvas (410). The updated visual representation, in this example, may include the delayed flight departure time, flight status information, and/or a gate number for the flight departure. Additionally, the updated visual representation may include a check-in element and/or a check-in button that may allow the participant to check-in for the flight prior to the flight departure time.

In further examples, an input inactivity may initiate operations to prompt the rendering engine to display the two-dimensional canvas (410). The rendering engine may monitor input activity and execute operations to display the two-dimensional canvas (410) in response to an input inactivity exceeding an inactivity timing threshold. The inactivity timing threshold may include a default value. In other examples, a value associated with the inactivity timing threshold may be customizable. The default value may include a minute threshold, a ten minute threshold, an hour threshold, and/or a day threshold, among other durations.

Figure 4:
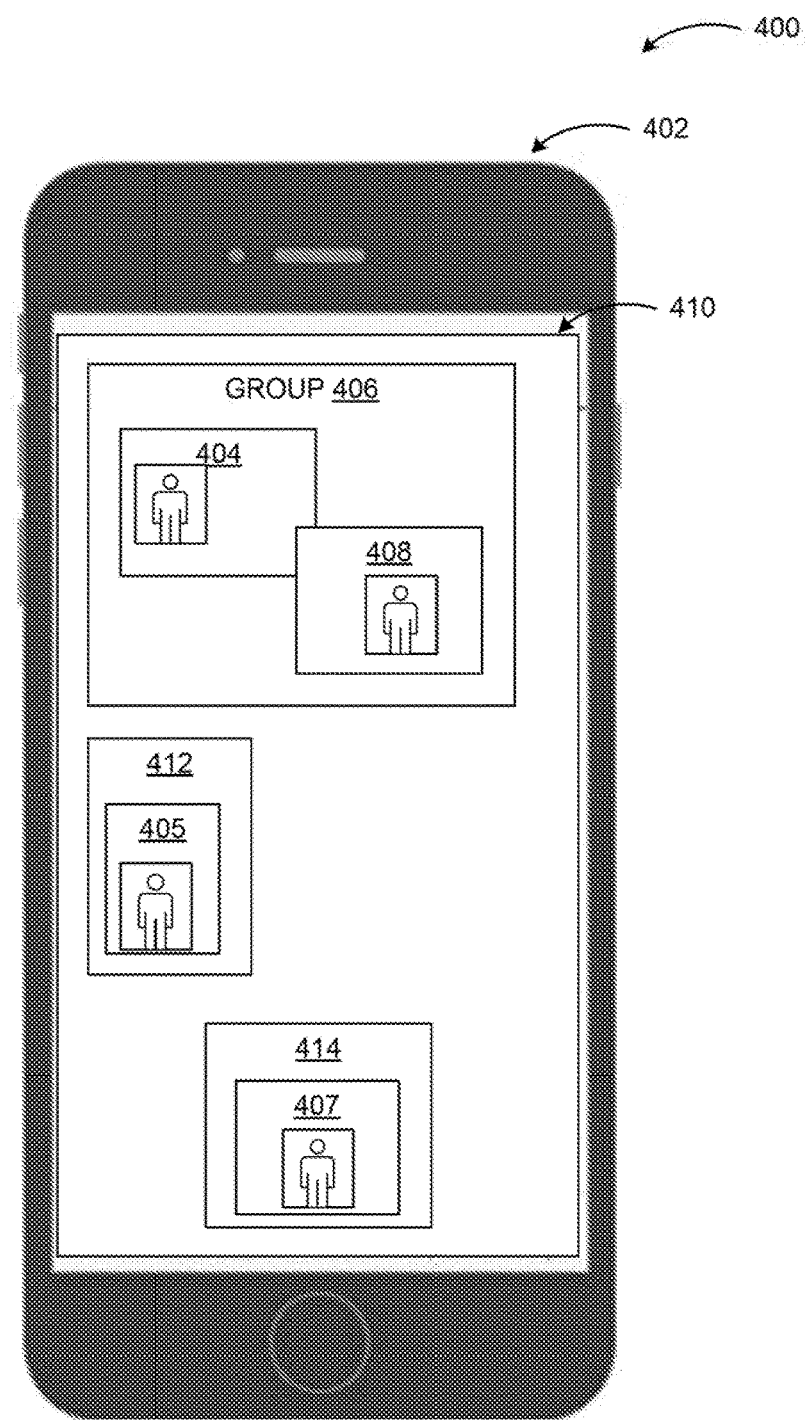
FIG. 4 is a display diagram illustrating a scheme to spatially organize communications on a two-dimensional canvas, according to embodiments.

FIG. 4 is a display diagram illustrating a scheme to spatially organize communications on a two-dimensional canvas, according to embodiments.

In a diagram 400, a computing device 402 may execute a communication application. The communication application may include a content engine and a rendering engine. The content engine of the communication application may generate a visual representation 404 of a communication and a visual representation 408 of another communication. The rendering engine may display the visual representations (404 and 408) on a two-dimensional canvas 410.

In some examples, the content engine may receive an input to group the visual representations (404 and 408). The content engine may analyze the attributes of the communication and the other communication to identify shared attributes. The shared attributes may include a subject matter attribute, a priority level attribute, and/or a time stamp attribute, among others.

In some examples, the content engine may create a group based on the shared attributes. The communication and the other communication may be related through the group. A group representation 406 may also be created based on the group. The rendering engine may display the visual representations (404 and 408) within the group representation 406. The group representation 406 may also be labelled with the shared attribute(s) to highlight the relationship between the visual representations (404 and 408) and associated communications.

In other examples, the content engine may identify similar linguistic phrases, similar metadata, and/or similar keywords in the attributes, among others as the shared attributes. For example, the content engine may identify "homework for social studies" in an attribute of the communication. The content engine may identify "history homework" in another attribute of the other communication. The content engine may identify a relationship between the attribute "homework for social studies" and "history homework" and classify the attributes as shared attributes.

In other examples, the content engine may receive an input to sort a visual representation 405 and a visual representation 407. The rendering engine may display the visual representation 405 in a spatial location 412 and the visual representation 407 in a spatial location 414. The spatial location 412 may be allotted a higher value than the spatial location 414 due to higher y-axis coordinates of the spatial location 412 compared the y-axis coordinates of the spatial location 414 in relation to a bottom of the two-dimensional canvas 410 displayed on the computing device 402.

The content engine may also analyze a priority level associated with the communications corresponding to the visual representations (405 and 407). A visual representation associated with a communication with a higher priority level may be repositioned to the spatial location 412 because of the spatial location 412 y-axis coordinates being higher than the spatial location 414. As such, if the communication associated with the visual representation 407 may be detected to have a higher priority level than the communication associated with the visual representation 405, the content engine may instruct the rendering engine to reposition the visual representation 407 to the spatial location 412 and the visual representation 405 to the spatial location 414. Examples associated with sorting of the visual representations (405 and 407) are not provided in a limiting sense. Other visual representations may he repositioned to the spatial locations (412 or 414) based on priority level associated with the communications.

In other examples, a size of the visual representation 405 may be changed to increase or decrease a priority level associated with a corresponding communication. If the size of the visual representation 405 is increased, then the priority level of the corresponding communication is proportionally increased as well. Alternatively, if the size of the visual representation 405 is decreased, then the priority level of the corresponding communication is proportionally decreased as well.

The content engine may also receive a removal input to remove the visual representation 404 and/or the visual representation 408 from the two-dimensional canvas 410. In response to the removal input, the content engine may instruct the rendering engine to remove the visual representation 404 and/or the visual representation 408 from the two-dimensional canvas 410.

The example scenarios and schemas in FIG. 1 through FIG. 4 are shown with specific components, data types, and configurations. Embodiments are not limited to systems according to these example configurations. Spatially organizing communications may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
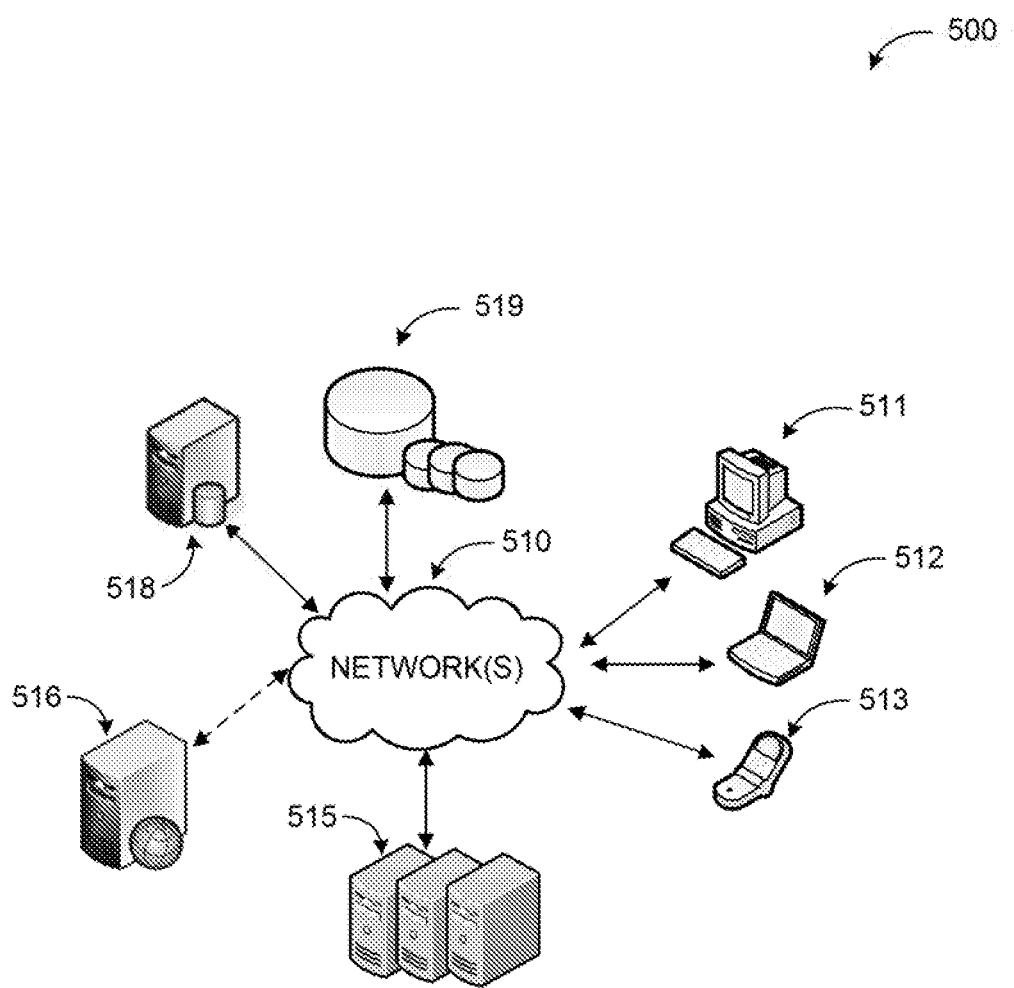
FIG. 5 is a simplified networked environment, where a system according to embodiments may be implemented.

FIG. 5 is a simplified networked environment, where a system according to embodiments may be implemented.

As shown in a diagram 500, a communication application may be implemented via software executed over servers 514. The platform may communicate with client applications on individual computing devices such as a smart phone 513, a mobile computer 512, or a desktop computer 511 ('client devices') through network(s) 510. The servers 514, may include one or more communication servers 516, where at least one of the one or more of the communication servers 516 may be configured to execute one or more applications (i.e. the communication, application). In other examples, the communication application may be provided by a third party service or may include a web application. The communication application may store communication data in a data store 519 directly or through a database server 518. Client applications executed on client devices 511-513 may be enabled for spatially organizing communications.

Client applications executed on any of the client devices 511-513 may facilitate communications via application(s) executed by the one or more communication servers 516, or on an individual communication server communication application may generate a visual representation of a communication in response to a detected intent to interact with the communication. The communication application may display the visual representation and modify the communication in response to an interaction with the visual representation.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the communications (e.g., the communication and another communication) described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to further enhance interaction between the communication data and the provided two-dimensional canvas.

Many other configurations of computing devices, applications, data sources, and data distribution systems may be employed for spatial organization of communications. Furthermore, the networked environments discussed in FIG. 5 are for illustration purposes only. Embodiments are not limited to the example applications, modules, or processes.

Figure 6:
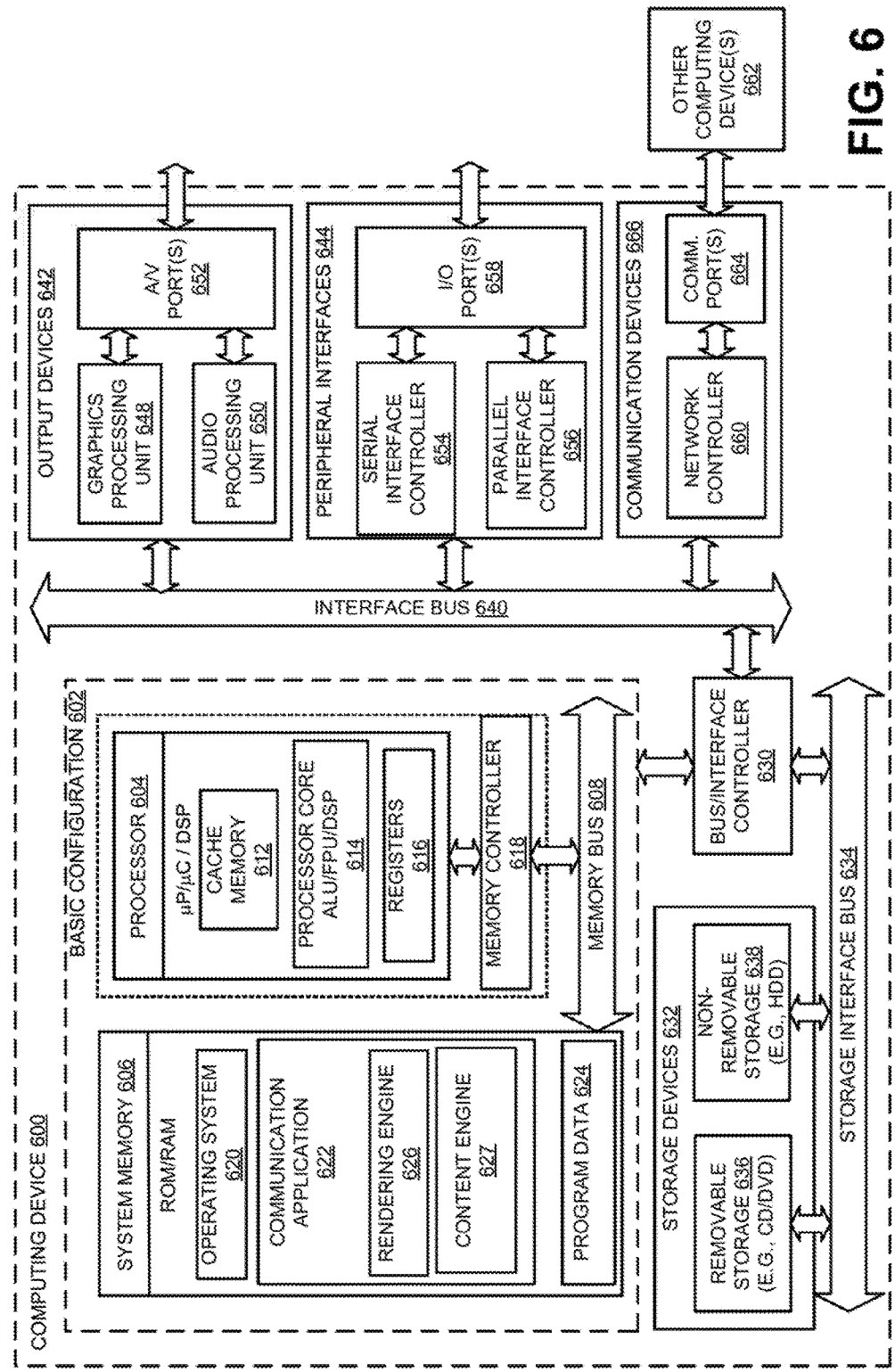
FIG. 6 is a block diagram of an example computing device, which may be used for spatially organizing communications, according to embodiments.

FIG. 6 is a block diagram of an example computing device, which may be used for spatially organizing communications, according to embodiments.

For example, a computing device 600 may be used as a server, a desktop computer a portable computer, a smart phone, a special purpose computer, or a similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 904 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include a rendering engine 626 and a content engine 627. The communication application 622 may utilize a display device associated with the computing device 600 to interact with other devices, such a client application. The program data 624 may also include, among other data, communication data or the like, as described herein, The content engine 627 may detect an intent to interact with the communication and generate a visual representation of the communication. The rendering engine 626 may display the visual representation on the two-dimensional canvas and provide a detected interaction on the visual representation to the content engine 627 to modify the communication.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented s a personal computer including both laptop computer and non-laptop computer configurations.

Example embodiments may also include methods for spatially organizing communications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
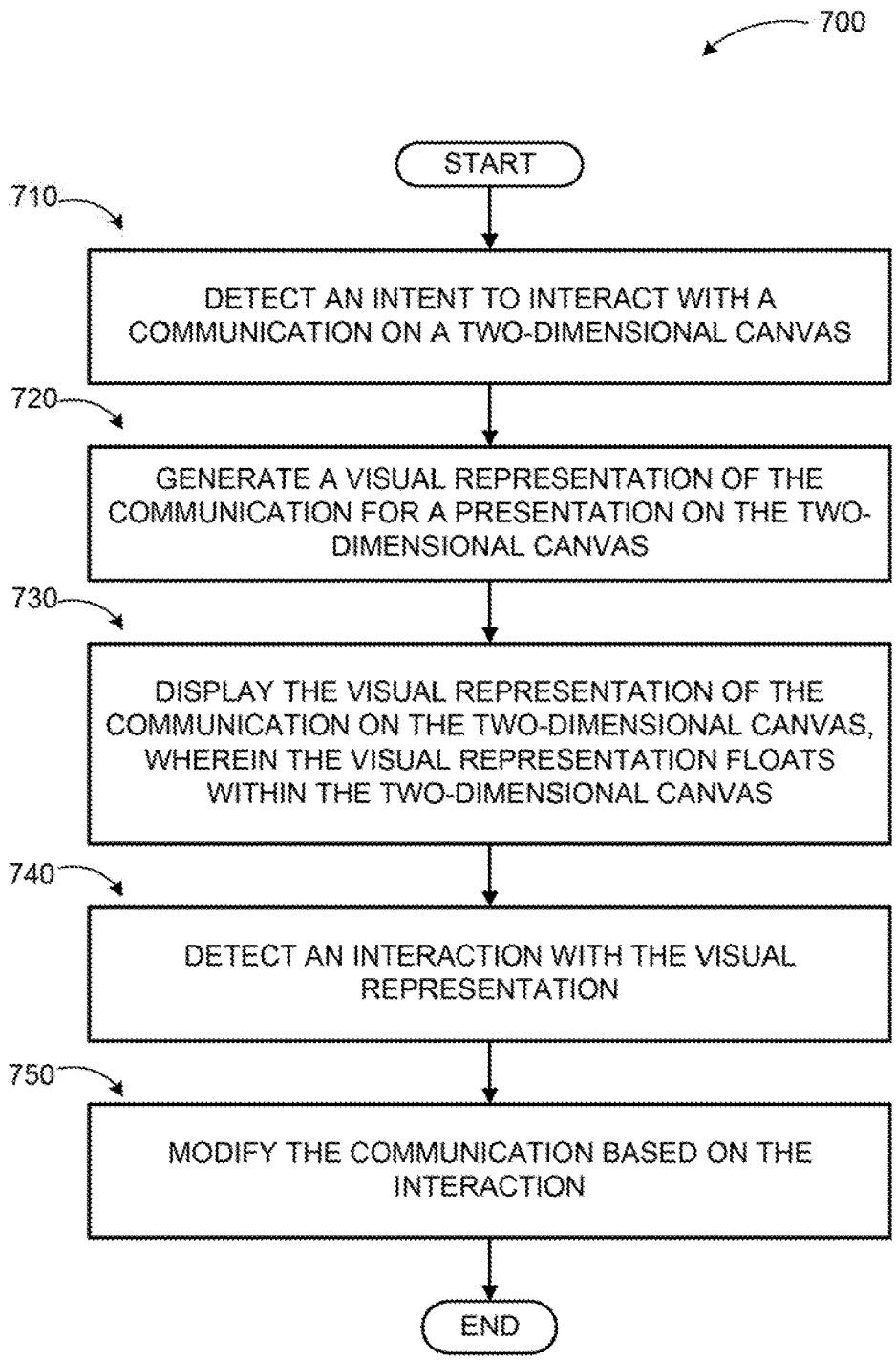
FIG. 7 is a logic flow diagram illustrating a process for spatially organizing communications, according to embodiments.

FIG. 7 is a logic flow diagram illustrating a process for spatially organizing communications, according to embodiments.

A process 700 may be implemented on a computing device, such as the computing device 600, or with another system. The computing device may include a memory and one or more processors coupled to the memory. The one or more processors may execute a communication application in conjunction with instructions stored in the memory. The communication application may include a rendering engine and a content engine, among others.

The process 700 begins with operation 710, where the communication application may detect an intent to interact with a communication on a two-dimensional canvas. The communication may include an instant messaging communication, an email, a text message, an audio message, a video message, and/or a graphical message, among other examples. At operation 720, the communication application may generate a visual representation of the communication. At operation 730, the visual representation may be displayed on the two-dimensional canvas. The visual representation may float within the two-dimensional canvas in a designated spatial location. At operation 740, an interaction with the visual representation is detected. The communication is modified based on the interaction at operation 750.

The operations included in process 700 are for illustration purposes. Spatially organizing communications may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device for spatially organizing communications is described. The computing device includes a display device, a memory, and one or more processors coupled to the memory and the display device. The one or more processors execute a communication application in conjunction with instructions stored in the memory. The communication application includes a content engine and a rendering engine. The content engine is configured to detect an intent to interact with a communication on a two-dimensional canvas and generate a visual representation of the communication for a presentation on the two-dimensional canvas. The rendering engine is configured to display, on the display device, the visual representation of the communication on the two-dimensional canvas, where the visual representation floats within the two-dimensional canvas, detect, on the display device, an interaction with the visual representation, and provide the interaction to the content engine to modify the communication based on the interaction.

In other examples, the content engine is further configured to generate another visual representation of another communication in response to another intent to interact with the other communication on the two-dimensional canvas and provide the other visual representation to the rendering engine for a presentation of the other visual representation tats the two-dimensional canvas. The rendering engine is further configured to display, on the display device, the visual representation at a first spatial location on the two-dimensional canvas and display, on the display device, the other visual representation at a second spatial location on the two-dimensional canvas. The content engine is further configured to receive an input to sort the visual representation and the other visual representation, compare a first priority level associated with the communication and a second priority level associated with the other communication to detect the first priority level as lower than the second priority level, and prompt the rendering engine to move the visual representation to the second spatial location and the other visual representation to the first spatial location. The content engine is further configured to receive an input to remove one or more of the visual representation and the other visual representation from the two-dimensional canvas and instruct the rendering engine to remove one or more of the visual representation and the other visual representation from the two-dimensional canvas.

In further examples, the content engine is further configured to receive an update associated with the communication, revise the visual representation with the update, and provide the updated visual representation to the rendering engine for a presentation of the updated visual representation. The rendering engine is further configured to detect a request to display the two-dimensional canvas on the display device and display the two-dimensional canvas on the display device. The rendering engine is further configured to detect an input inactivity, associated with the display device, exceed an inactivity timing threshold and display the two-dimensional canvas on the display device. The rendering engine is further configured to detect another interaction with the visual representation to display the communication and display the communication on the display device.

In other examples, the content engine is further configured to receive another interaction with the visual representation, where the other interaction modifies an initial size of the visual representation to a modified size of the visual representation, detect the modified size as larger than the initial size, and increase a priority level associated with the communication based on a change from the initial size to the modified size of the visual representation. The content engine is further configured to receive another interaction with the visual representation, where the other interaction modifies an initial size of the visual representation to a modified size of the visual representation detect the initial size as smaller than the modified size, and decrease a priority level associated with the communication based on a change from the initial size to the modified size of the visual representation.

In some examples, a method executed on a computing device for spatially organizing communications is described. The method includes detecting an intent to interact with a communication on a two-dimensional canvas, where the communication includes one or more of an instant messaging communication, an email, a text message, an audio message, a video message, and a graphical message, generating a visual representation of the communication for a presentation on the two-dimensional canvas, displaying the visual representation of the communication on the two-dimensional canvas, where the visual representation floats within the two-dimensional canvas, detecting an interaction with the visual representation, and modifying the communication based on the interaction.

In other examples, the method further includes generating another visual representation of another communication in response to another intent to interact with the other communication, where the intent includes one or more of: a drag and drop action, a tap action, a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and a time based input, displaying the other visual representation on the two-dimensional canvas, receiving an input to group the visual representation and the other visual representation, identifying shared attributes between the communication and the other communication, where the shared attributes include one or more of: a subject matter attribute, a priority level attribute, and a time stamp attribute, associating the communication and the other communication within a group created from the shared attributes, and displaying the visual representation and the other visual representation within a group representation of the group on the two-dimensional canvas.

In further examples, the method further includes detecting another input to modify the two-dimensional canvas and modifying the two-dimensional canvas, where the modification changes a property of the two-dimensional canvas including one or more of a size, a font style, a graphical formatting, a color formatting, and a shading formatting. The visual representation includes one or more of one or more attributes associated with the communication, a priority level associated with the communication, a deadline associated with the communication, and information associated with the communication.

In some examples, a computer-readable memory device with instructions stored thereon for spatially organizing communications is described. The instructions include actions similar to the actions of the method.

In some examples, a means for spatially organizing communications is provided. The means for spatially organizing communications includes a means for detecting an intent to interact with a communication on a two-dimensional canvas, a means for generating a visual representation of the communication for a presentation on the two-dimensional canvas, a means for displaying the visual representation of the communication on the two-dimensional canvas, where the visual representation floats within the two-dimensional canvas, a means for detecting an interaction with the visual representation, and a means for providing the interaction to the content engine to modify the communication based on the interaction.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for spatially organizing email, the computing device comprising:
    a memory; and
    one or more processors coupled to the memory, the one or more processors executing a communication application in conjunction with instructions stored in the memory, wherein the one or more processors are configured to:
        detect a placement of an email from an ordered list portion of a user interface (UI) of the communication application to a two-dimensional canvas portion of the UI;
        generate a visual representation for the email that floats within the two-dimensional canvas portion of the UI such that a location of the visual representation on the two-dimensional canvas portion of the UI is selectable by a user, wherein the visual representation includes information associated with the email;
        provide to be displayed the visual representation of the email on the two-dimensional canvas portion of the UI;
        receive an update associated with the email; and
        revise display of information within the visual representation based on the received update.

2. The computing device of claim 1, wherein the one or more processors are further configured to:
    generate another visual representation of another email in response to another placement of the other email from the ordered list portion of the UI to the two-dimensional canvas portion of the UI; and
    provide to be displayed the other visual representation on the two-dimensional canvas portion of the UI.

3. The computing device of claim 2, wherein the one or more processors are further configured to:
    provide to be displayed the visual representation at a first spatial location on the two-dimensional canvas portion of the UI; and
    provide to be displayed the other visual representation at a second spatial location on the two-dimensional canvas portion of the UI.

4. The computing device of claim 3, wherein the one or more processors are further configured to:
    receive an input to sort the visual representation and the other visual representation;
    compare a first priority level associated with the email and a second priority level associated with the other email to detect the first priority level as lower than the second priority level; and
    move the visual representation to the second spatial location and the other visual representation to the first spatial location.

5. The computing device of claim 2, wherein the one or more processors are further configured to:
    receive an input to remove one or more of the visual representation and the other visual representation from the two-dimensional canvas portion of the UI; and
    remove one or more of the visual representation and the other visual representation from the two-dimensional canvas portion of the UI.

6. The computing device of claim 1, wherein the one or more processors are further configured to:
    detect a request to display the two-dimensional canvas portion of the UI on a display device; and
    provide to be displayed, the two-dimensional canvas portion of the UI on the display device.

7. The computing device of claim 1, wherein the one or more processors are further configured to:
    detect an input inactivity that exceeds an inactivity timing threshold; and
    provide to be displayed, the two-dimensional canvas portion of the UI on a display device.

8. The computing device of claim 1, wherein the one or more processors are further configured to:
    detect an interaction with the visual representation to display the email; and
    provide to be displayed, the email.

9. The computing device of claim 1, wherein the one or more processors are further configured to:

receive an interaction with the visual representation, wherein the interaction modifies an initial size of the visual representation to a modified size of the visual representation;

detect the modified size as larger than the initial size; and increase a priority level associated with the email based on a change from the initial size to the modified size of the visual representation.

10. The computing device of claim 1, wherein the one or more processors are further configured to:

receive an interaction with the visual representation, wherein the interaction modifies an initial size of the visual representation to a modified size of the visual representation;

detect the initial size as smaller than the modified size; and decrease a priority level associated with the email based on a change from the initial size to the modified size of the visual representation.

11. The computing device of claim 1, wherein the information associated with the email includes one or more of attributes associated with the email, a priority level associated with the email, and a deadline associated with the email.

12. A method executed on a computing device for spatially organizing email, the method comprising:

detecting a placement of an email from an ordered list portion of a user interface (UI) of a communication application to a two-dimensional canvas portion of the UI;

generating a visual representation for the email that floats within the two-dimensional canvas portion of the UI such that a location of the visual representation on the two dimensional canvas portion of the UI is selectable by a user, wherein the visual representation includes information associated with the email;

providing to be displayed the visual representation of the email on the two-dimensional canvas portion of the UI;

receiving an update associated with the email; and revising display of information within the visual representation based on the received update.

13. The method of claim 12, further comprising:

generating another visual representation of another email in response to another placement of the other email from the ordered list portion of the UI to the two-dimensional canvas portion of the UI, wherein the-placement includes one or more of: a drag and drop action, a tap action, a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and a time based input; and providing to be displayed, the other visual representation on the two-dimensional canvas portion of the UI.

14. The method of claim 13, further comprising:

receiving an input to group the visual representation and the other visual representation; and identifying shared attributes between the email and the other email, wherein the shared attributes include one or more of: a subject matter attribute, a priority level attribute, and a time stamp attribute.

15. The method of claim 14, further comprising:

associating the email and the other email within a group created from the shared attributes; and providing to be displayed, the visual representation and the other visual representation within a group representation of the group on the two-dimensional canvas portion of the UI.

16. The method of claim 12, further comprising:

detecting an input to modify the two-dimensional canvas portion of the UI; and modifying the two-dimensional canvas, wherein the modification changes a property of the two-dimensional canvas including one or more of a size, a font style, a graphical formatting, a color formatting, and a shading formatting.

17. The method of claim 12, wherein the information associated with the email includes one or more of: one or more attributes associated with the email, a priority level associated with the email, a deadline associated with the email, and information associated with the email.

18. A computer-readable memory device with instructions stored thereon for spatially organizing email, the instructions comprising:

detecting a placement of an email from an ordered list portion of a user interface (UI) of a communication application to a two-dimensional canvas portion of the UI;

generating a visual representation for the email that floats within the two-dimensional canvas portion of the UI such that a location of the visual representation on the two dimensional canvas portion of the UI is selectable by a user;

providing to be displayed the visual representation of the email on the two-dimensional canvas portion of the UI;

receiving an update associated with the email; and revising display of information within the visual representation based on the received update.

19. The computer-readable memory device of claim 18, wherein the instructions further comprise:

generating another visual representation of another email in response to another placement of the other email from the ordered list portion of the UI to the two-dimensional canvas portion of the UI;

providing to be displayed, the visual representation at a first spatial location on the two-dimensional canvas; and providing to be displayed, the other visual representation at a second spatial location on the two-dimensional canvas portion of the UI.

20. The computer-readable memory device of claim 19, wherein the instructions further comprise:

generating another visual representation of another email in response to another placement of the other email from the ordered list portion of the UI to the two-dimensional canvas portion of the UI;

receiving an input to group the visual representation and the other visual representation;

identifying shared attributes between the email and the other email;

associating the email and the other email within a group created from the shared attributes; and providing to be displayed, the visual representation and the other visual representation within a group representation of the group on the two-dimensional canvas portion of the UI.

* * * * *